Aug. 12, 1941.  I. G. LEONARD  2,252,229
TRAP FOR FUR-BEARING ANIMALS
Filed Nov. 29, 1940
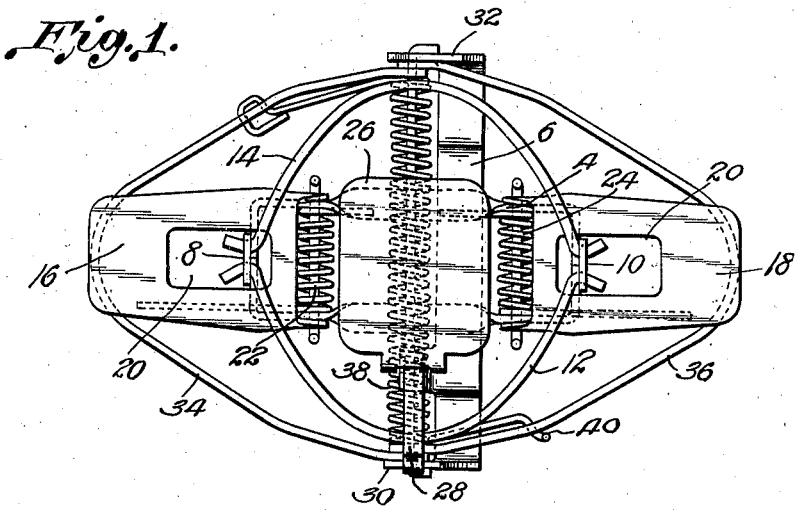
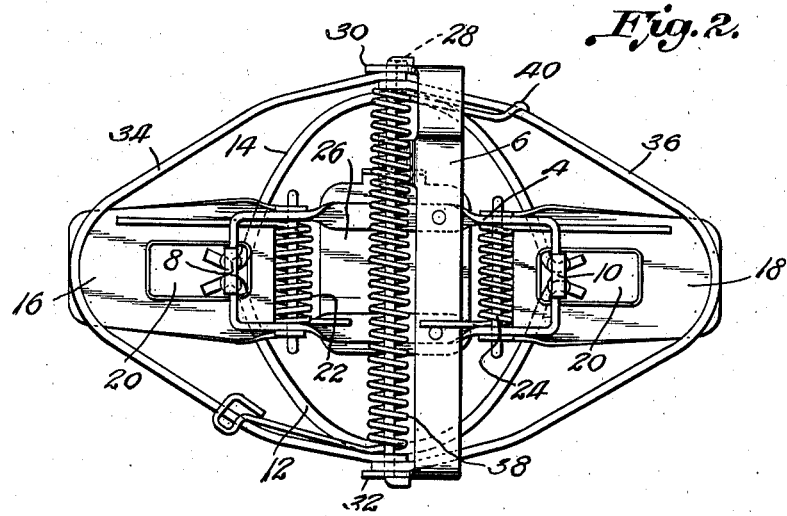
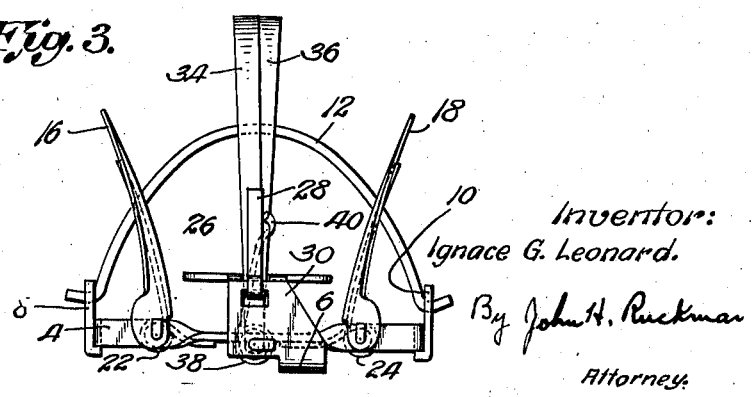
Inventor:
Ignace G. Leonard.
By John H. Ruckman
Attorney.

Patented Aug. 12, 1941

2,252,229

UNITED STATES PATENT OFFICE 2,252,229

TRAP FOR FUR-BEARING ANIMALS

Ignace G. Leonard, New Orleans, La.

Application November 29, 1940, Serial No. 367,713

2 Claims. (Cl. 43—90)

My invention relates to traps for fur-bearing animals. In trapping for fur-bearing animals such as musk-rats, the trapper sets a large number of traps distributed around at various places frequented by the animals. Ordinarily the trapper does not get around to inspect these traps and remove the trapped animals more than once in every twenty-four hours.

It is common knowledge that when the customary steel trap is sprung, the leg of the animal caught therein is broken and the animal if not restrained will twist around in such manner as to twist off the leg and escape. Before the time of my invention, escape of the animals in the manner just referred to, has been prevented by providing the trap with an attachment in the nature of a striker which is released immediately when the trap is sprung and hits the body of the animal a heavy blow thereby frequently killing it. While such a contrivance is effective in preventing the animal from escaping, it has been found that the fur of the animal is apt to be damaged. This is due to the fact that when the striker knocks the animal down, it rests upon the fur and, unless the animal is promptly removed, the striker becomes so firmly attached to the fur as to injure the most valuable part thereof.

An object therefore of my invention is to provide a trap which will not only prevent escape of the trapped animal but will do so without damage to the fur. I accomplish the objects of my invention by providing a trap which in addition to a pair of spring stressed jaws, has a secondary pair of spring stressed jaws which come together upon the caught leg of the animal above the main pair of jaws during the closing of the latter so as to additionally grip the leg close to the body of the animal. This prevents the animal from twisting to an extent which might cause severing of the leg and release of the animal.

The novel features which I believe to be characteristic of my invention are set forth with particularity in the appended claims. The invention itself, however, both as to its organization and method of operation, together with additional objects and advantages thereof, will be best understood from the following description of a specific embodiment when read in connection with the accompanying drawing in which:

Fig. 1 is a top plan view of the trap in open position.

Fig. 2 is a bottom plan view thereof.

Fig. 3 is a side elevational view showing the trap in closed position.

Referring to the construction shown in the drawing which illustrates the principle of operation of my device, I provide a support which consists of a frame 4 to which a cross bar 6 is secured, this cross bar extending under the sides of the frame 4 and being of such length as to project out beyond the sides. Lugs 8 and 10 extend up from the ends of the frame 4, with a pair of main jaws 12 and 14 pivotally mounted at their lower ends in these lugs. A pair of plates 16 and 18 are pivoted in the frame 4 toward the ends thereof. Each of these plates is provided with an open center 20. The jaws 12 and 14 pass through these open centers. The pivotal attachments of the plates 16 and 18 are provided with coiled springs 22 and 24 so arranged as to stress the plates in upward direction. It will now be apparent from the drawing that when the plates 16 and 18 are secured in down position as shown in Fig. 1, the jaws 12 and 14 will remain in open position. In order to hold these parts in open position, a pan or trigger plate 26 is pivoted to the cross bar 6, a catch 28 also being pivoted to this cross bar in such position as to be adapted to hold the pan 26 in set position. When the pan 26 is released, the springs 22 and 24 which are very stiff, quickly force the plates 16 and 18 upwardly and since the jaws 12 and 14 ride in the openings 20 of the plates, it follows that these jaws are brought together with a quick snap.

The ends of the cross bar 6 are provided with upstanding lugs 30 and 32 in which the lower ends of a pair of secondary jaws 34 and 36 are pivoted. This pivotal attachment is provided with a coiled spring 38 and so arranged as to stress the jaws 34 and 36 in upward direction. It will be noted that when the trap is set with the plates 16 and 18 in down position, then the ends of these plates overlap the middle portion of the jaws 34 and 36 and hold them down or in open position. However, as soon as the plates 16 and 18 are released, they move off from the jaws 34 and 36 so that they close practically as soon as the main jaws 12 and 14 do. As is apparent from Fig. 3, the jaws 34 and 36 are considerably longer than the main jaws 12 and 14 and therefore will grip the leg of the animal considerably higher or close to the body. As is apparent from Fig. 1, the end 40 of the spring 38 is made in the form of a hook which can be unhooked from its engagement with the jaw 34 when it is desired that the secondary jaws shall not operate.

The operation and advantage of my invention will be readily understood in connection with the foregoing description and the accompanying drawing. The trap may be readily set by holding the jaws down and engaging the catch 28 with the pan 26. When the animal steps on the pan and depresses it, both pairs of jaws are released and quickly snap shut upon the leg. It will be noted that the secondary jaws 34 and 36 are not only longer than the main jaws but operate at right angles thereto, so that the animal is prevented from twisting the leg off and escaping. Furthermore, the pelt is preserved in its natural condition without being damaged. It is obvious that the trap may be fastened at the place where it is to be set in any well known or suitable manner.

I claim:

1. A trap for fur-bearing animals comprising a support, a pair of main jaws pivoted to said support for gripping a leg of the animal, a pair of elongated open-center plates pivoted to said support, said jaws riding in said open centers, a pair of spring stressed secondary jaws pivoted to said support adapted to be held down by the outer ends of said pair of plates respectively, said secondary jaws being so constructed and arranged as to bite into the flesh of said leg above and at right angles to the gripping by said main jaws when the trap is sprung, and means for holding the trap in set condition.

2. A trap for fur-bearing animals comprising a frame member, a cross bar secured to said frame member and extending out beyond the sides thereof, a pair of main jaws pivoted at the ends of said frame member for gripping a leg of the animal, a pair of spring stressed elongated open-center plates pivotally mounted in said frame member toward the respective ends thereof, said jaws riding in said open centers, a pair of spring stressed secondary jaws pivoted to the ends of said cross bar adapted to be held down by the outer ends of said pair of plates respectively, said secondary jaws being so constructed and arranged as to bite into the flesh of said leg above and at right angles to the gripping by said main jaws when the trap is sprung, and means for holding the trap in set condition.

IGNACE G. LEONARD.